(12) United States Patent
Tong et al.

(10) Patent No.: US 11,132,943 B2
(45) Date of Patent: Sep. 28, 2021

(54) DISPLAY METHOD, DISPLAY OPTIMIZATION DEVICE, AND DISPLAY DEVICE

(71) Applicants: Chengdu BOE Optoelectronics Technology Co., Ltd., Chengdu (CN); BOE TECHNOLOGY GROUP CO., LTD., Beijing (CN)

(72) Inventors: Zhenxiao Tong, Beijing (CN); Youngyik Ko, Beijing (CN); Weiyun Huang, Beijing (CN); Yue Long, Beijing (CN); Tianyi Cheng, Beijing (CN)

(73) Assignees: Chengdu BOE Optoelectronics Technology Co., Ltd., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 111 days.

(21) Appl. No.: 16/478,603

(22) PCT Filed: Dec. 12, 2018

(86) PCT No.: PCT/CN2018/120704
§ 371 (c)(1),
(2) Date: Jul. 17, 2019

(87) PCT Pub. No.: WO2019/137141
PCT Pub. Date: Jul. 18, 2019

(65) Prior Publication Data
US 2020/0005704 A1 Jan. 2, 2020

(30) Foreign Application Priority Data
Jan. 12, 2018 (CN) .......................... 201810030506.5

(51) Int. Cl.
*G09G 3/3208* (2016.01)

(52) U.S. Cl.
CPC ... *G09G 3/3208* (2013.01); *G09G 2320/0242* (2013.01); *G09G 2320/0626* (2013.01); *G09G 2360/16* (2013.01)

(58) Field of Classification Search
CPC ......... G06F 3/14; G06F 3/147; G09G 3/2003; G09G 3/3208; G09G 5/026;
(Continued)

(56) References Cited

U.S. PATENT DOCUMENTS

2005/0093798 A1 5/2005 Kamada et al.
2016/0094598 A1* 3/2016 Gedikian .............. H04W 4/021
455/456.3
(Continued)

FOREIGN PATENT DOCUMENTS

CN 106991981 7/2017
CN 107422516 12/2017
(Continued)

OTHER PUBLICATIONS

International Search Report and Written Opinion dated Mar. 1, 2019 for PCT Patent Application No. PCT/CN2018/120704.
(Continued)

*Primary Examiner* — Stacy Khoo
(74) *Attorney, Agent, or Firm* — Thomas | Horstemeyer, LLP

(57) ABSTRACT

A display method includes: acquiring image data of an irregularly-shaped area of a display panel; performing smoothing processing on the image data of the irregularly-shaped area to generate image compensation data; and converting the image compensation data into a driving compensation voltage to be output to the display panel.

13 Claims, 5 Drawing Sheets

(58) Field of Classification Search
CPC ....... G09G 2320/02; G09G 2320/0242; G09G 2320/0626; G09G 2360/16
See application file for complete search history.

(56) References Cited

U.S. PATENT DOCUMENTS

2018/0130397 A1* 5/2018 Zheng .................... G09G 3/207
2018/0374401 A1  12/2018 Yang et al.

FOREIGN PATENT DOCUMENTS

| | | |
|---|---|---|
| CN | 107422517 | 12/2017 |
| CN | 107450878 | 12/2017 |
| CN | 107526201 | 12/2017 |
| CN | 108198534 | 6/2018 |
| JP | 2005134560 | 5/2005 |
| JP | 4617076 | 1/2011 |
| KR | 20050040689 | 5/2005 |
| KR | 100597507 | 7/2006 |
| TW | 200515361 | 5/2005 |
| TW | I251202 | 3/2006 |

OTHER PUBLICATIONS

1st Office Action dated May 8, 2019 for Chinese Patent Application No. 201810030506.5.

* cited by examiner

DISPLAY METHOD, DISPLAY OPTIMIZATION DEVICE, AND DISPLAY DEVICE

CROSS REFERENCE TO RELATED APPLICATIONS

The present application is a § 371 national phase application of International Patent Application No. PCT/CN2018/120704, filed on Dec. 12, 2018, which is based upon, claims the benefit of, and claims priority to Chinese Patent Application No. 201810030506.5 filed on Jan. 12, 2018, the contents of which being incorporated by reference in their entirety herein as a part of the present application.

TECHNICAL FIELD

The present disclosure relates to the technical field of displays and, in particular, to a display method, a display optimization device, and a display device.

BACKGROUND

With the development of self-luminous display technology, Organic Light Emitting Diode (OLED) has gradually replaced the traditional liquid crystal display (LCD) with its advantages of low cost, low power consumption, wide viewing angle, wide color gamut, high contrast, and fast response. It is also widely used in flexible wearable devices such as smart watches.

With the development of portable devices, some displays may need to have irregularly-shaped portions to meet hardware requirements or to achieve an exceptional display effect, depending on the actual needs of the user.

It should be noted that the information disclosed in the Background section above is only for enhancement of understanding of the background of the present disclosure, and thus may include information that does not constitute prior art known to those of ordinary skill in the art.

SUMMARY

The present disclosure provides a display method and a non-transitory computer-readable medium associated therewith.

Also, the present disclosure provides a display optimization device, a display device, and a system associated therewith.

According to an aspect of the present disclosure, a display method is provided, including:

acquiring image data of an irregularly-shaped area of a display panel;

performing smoothing processing on the image data of the irregularly-shaped area to generate image compensation data; and converting the image compensation data into a driving compensation voltage to be output to the display panel.

In an exemplary embodiment of the present disclosure, acquiring image data of an irregularly-shaped area of a display panel includes:

acquiring a grayscale image of the irregularly-shaped area of the display panel, and converting the grayscale image of the irregularly-shaped area into the image data of the irregularly-shaped area.

In an exemplary embodiment of the present disclosure, when the display panel displays a white screen, the grayscale image of the irregularly-shaped area is acquired by an optical measuring device.

In an exemplary embodiment of the present disclosure, acquiring image data of an irregularly-shaped area of a display panel includes:

extracting an electrical signal of the irregularly-shaped area of the display panel from a driving circuit of the display panel as the image data of the irregularly-shaped area.

In an exemplary embodiment of the present disclosure, performing smoothing processing on the image data of the irregularly-shaped area to generate image compensation data includes:

performing a partition processing on the irregularly-shaped area based on the image data of the irregularly-shaped area, to divide the irregularly-shaped area into an internal display area, a border display area, and a non-display area; and performing image compensation respectively on the image data of the areas of the irregularly-shaped area based on the image data of the internal display area, the border display area, and the non-display area, to generate image compensation data that makes the border display area to present grayscale transition.

In an exemplary embodiment of the present disclosure, pixel units arranged in sawtooth-shaped steps along an edge of the irregularly-shaped area are taken as the border display area; a portion on one side of the border display area which has a higher brightness is taken as the inner display area, and a portion on the other side of the border display area which has a lower brightness is taken as the non-display area.

In an exemplary embodiment of the present disclosure, performing image compensation respectively on the image data of the areas of the irregularly-shaped area based on the image data of the internal display area, the border display area, and the non-display area includes:

calculating image compensation data of the inner display area, the border display area, and the non-display area of the irregularly-shaped area according to $X'=aX+b$;

where $X'$ is the image compensation data, and $X$ is the image data, $a$ is a compensation coefficient, and $b$ is a compensation value.

In an exemplary embodiment of the present disclosure, for the border display area, the compensation coefficient $a$ is determined according to an absolute value of a tangent slope of the border display area and $0<a<1$, and the compensation value $b$ is determined according to a luminance difference between the inner display area adjacent to the border display area and the border display area, and an absolute value of a tangent slope of the border display area;

for the inner display area, the compensation coefficient $a=1$, the compensation value $b=0$; and for the non-display area, the compensation coefficient $a=0$, and the compensation value $b=0$.

According to one aspect of the present disclosure, there is provided a display optimization device including:

a detecting circuit configured to acquire image data of an irregularly-shaped area of a display panel;

a compensation circuit configured to perform smoothing processing on the image data of the irregularly-shaped area to generate image compensation data; and a driving circuit configured to convert the image compensation data into a driving compensation voltage to be output to the display panel.

In an exemplary embodiment of the present disclosure, the detecting circuit includes:

an optical detecting sub-circuit is configured to acquire a grayscale image of the irregularly-shaped area of the display panel, and convert the grayscale image of the irregularly-shaped area into the image data of the irregularly-shaped area.

In an exemplary embodiment of the present disclosure, the detecting circuit includes:

an electrical detecting sub-circuit configured to extract an electrical signal of the irregularly-shaped area of the display panel from a driving circuit of the display panel as the image data of the irregularly-shaped area.

In an exemplary embodiment of the present disclosure, the compensation circuit includes:

a partitioning sub-circuit configured to perform a partition processing on the irregularly-shaped area based on the image data of the irregularly-shaped area, to divide the irregularly-shaped area into an internal display area, a border display area, and a non-display area; and a compensation sub-circuit configured to perform image compensation respectively on the image data of the areas of the irregularly-shaped area based on the image data of the internal display area, the border display area, and the non-display area, to generate image compensation data that makes the border display area to present grayscale transition.

In an exemplary embodiment of the present disclosure, the compensation sub-circuit is configured to respectively calculate image compensation data of the inner display area, the border display area, and the non-display area of the irregularly-shaped area according to $X'=aX+b$;

where $X'$ is the image compensation data, and $X$ is the image data, a is a compensation coefficient, and b is a compensation value.

In an exemplary embodiment of the present disclosure, for the border display area, the compensation coefficient a is determined according to an absolute value of a tangent slope of the border display area and $0<a<1$, and the compensation value b is determined according to a luminance difference between the inner display area adjacent to the border display area and the border display area, and an absolute value of a tangent slope of the border display area;

for the inner display area, the compensation coefficient $a=1$, the compensation value $b=0$; and for the non-display area, the compensation coefficient $a=0$, and the compensation value $b=0$.

According to one aspect of the present disclosure, there is provided a display device including the above display optimization device and a display panel.

According to one aspect of the present disclosure, there is provided a display device including:

a display panel having an irregularly-shaped area;

a processor; and a memory storing computer readable instructions that, when executed, cause the processor to be configured to perform the method according to the above embodiments of the present disclosure.

According to one aspect of the present disclosure, there is provided a computer readable medium storing instructions that, when executed by a processor of a smart shopping system, cause the smart shopping system to perform the method according to the above embodiments of the present disclosure.

It should be noted that the information disclosed in the Background section above is only for enhancement of understanding of the background of the present application, and thus, may include information that does not constitute prior art known to those of ordinary skill in the art.

This section provides an overview of various implementations or examples of the techniques described in this disclosure, and is not a comprehensive disclosure of the full scope or all features of the disclosed technology.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure. Understandably, the drawings in the following description only illustrate some embodiments of the present disclosure, and other drawings can be obtained from these drawings by those skilled in the art without any creative effort.

DETAILED DESCRIPTION

Figure 1:
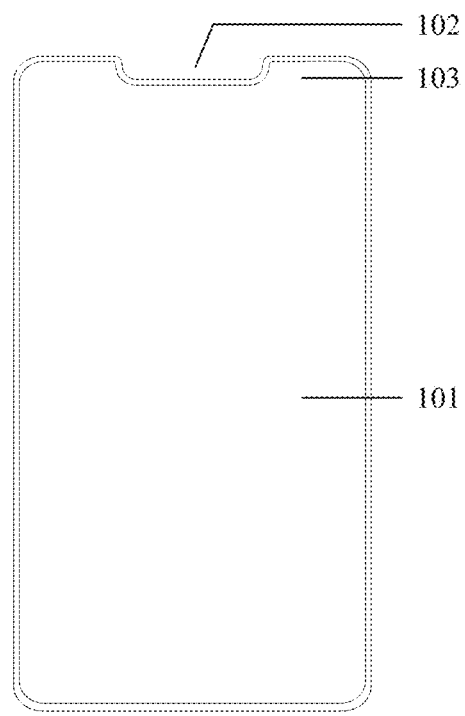
FIG. 1 is a schematic diagram showing a display screen of a full screen borderless form in an exemplary embodiment of the present disclosure.

Exemplary embodiments will now be described more fully with reference to the accompanying drawings. However, the exemplary embodiments can be embodied in a variety of forms and should not be construed as being limited to the embodiments set forth herein. Rather, these embodiments are provided to make the present disclosure thorough and complete, and to fully convey the concept of the exemplary embodiments to those skilled in the art. The described features, structures, or characteristics may be combined in any suitable manner in one or more embodiments.

In addition, the accompanying drawings are merely schematic representations of the present disclosure and are not necessarily drawn to scale. The same reference numerals in the drawings denote the same or similar parts, and the repeated description thereof will be omitted. Some of the block diagrams shown in the figures are functional entities and do not necessarily have to correspond to physically or logically separate entities. These functional entities may be implemented in software, or implemented in one or more hardware modules or integrated circuits, or implemented in different networks and/or processor devices and/or microcontroller devices.

Figure 2:
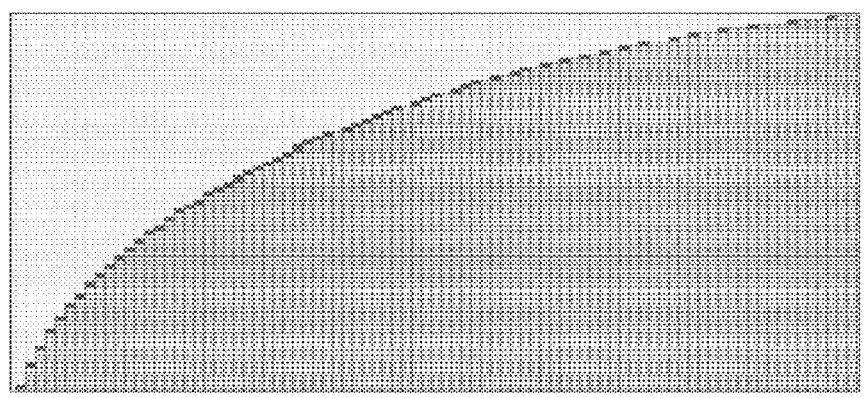
FIG. 2 is a schematic diagram showing a pixel arrangement of a corner area of a display screen in an exemplary embodiment of the present disclosure.
Figure 3:
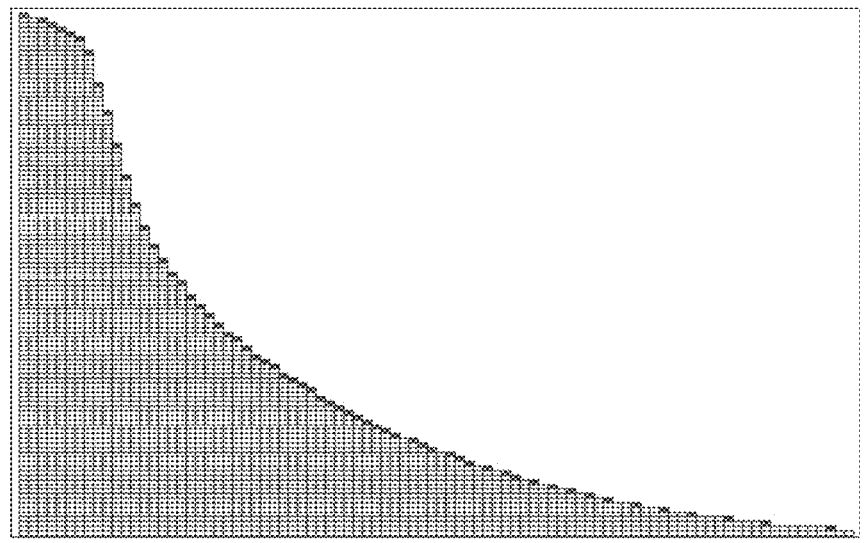
FIG. 3 is a schematic diagram showing a pixel arrangement of a grooved display area in an exemplary embodiment of the present disclosure.

As an exemplary application of a display having an irregularly-shaped area, a borderless full screen device is becoming a mainstream form of mobile devices, such as mobile phones, due to its ultra-high screen ratio and better user experience. FIG. 1 is a display screen of a full screen borderless form, which can be divided into three parts: a main display area 101 for conventional display, a grooved area for leaving space for a mobile phone camera and an earphone, that is, a non-display area 102, and a sub-display area 103 separated by the groove area. Four corners of the display screen are formed by a circular arc of a certain radius, and the leaving areas for the camera and the earphone are usually trapezoidal, rectangular, or curved grooved areas and, in this case, the border of the display area is also composed of inclined lines and rounded corners of a certain radius. FIGS. 2 and 3 respectively show a pixel arrangement diagram of a corner area and a grooved area of the display screen. Since each of the smallest complete pixel units (including R, G, and B colors) is a rectangle having a certain size, when a smallest complete pixel unit is arranged along an edge of a corner area or a grooved area, the edge of the display area may present sawtooth-shaped steps. Thus, when the display screen is lit up, sawteeth visible to the naked eye may appear at the corner areas and the grooved areas, reducing the display effect.

Figure 4:
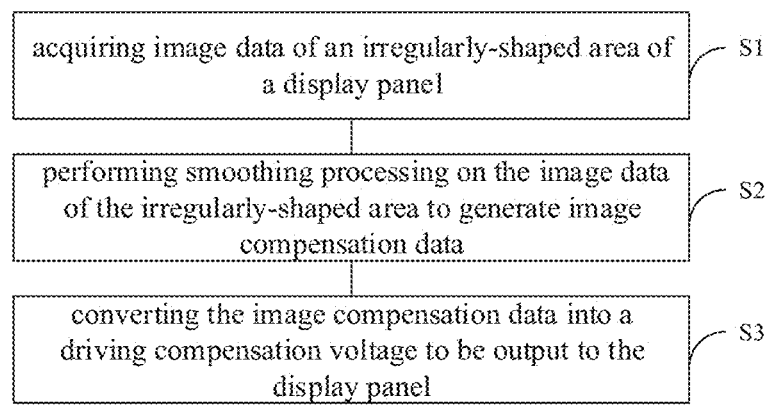
FIG. 4 schematically shows a flowchart of a display method in an exemplary embodiment of the present disclosure.

An exemplary embodiment of the present disclosure provides a display method applied for display image optimization of an irregularly-shaped area of a display panel, such as a corner area and a grooved area of a full screen. As shown in FIG. 4, the display method may include the following steps.

In step S1, image data of an irregularly-shaped area of a display panel is acquired.

In step S2, smoothing processing is performed on the image data of the irregularly-shaped area to generate image compensation data.

In step S3, the image compensation data is converted into a driving compensation voltage to be output to the display panel.

The irregularly-shaped area of the display panel refers to a corner area of the display panel and a macroscopic non-rectangular area for leaving space for a grooved area of a camera or an earphone.

According to an embodiment of the present disclosure, the irregularly-shaped area refers to an area having a non-horizontal edge or a non-vertical edge of the border of the display panel. In other words, at the border of the irregularly-shaped area, a direction of an edge of the display panel is different from the direction of the scan line and the direction of the data line.

In the display method provided by the exemplary embodiment of the present disclosure, image compensation data can be generated according to image data of the irregularly-shaped area to perform smoothing processing on the display edge of the irregularly-shaped area, and then, the image compensation data is converted into a driving compensation voltage to be output to the display panel, so as to achieve the compensation effect on the display edge of the irregularly-shaped area. In this way, the edge sawteeth phenomenon of the irregularly-shaped area of the display panel can be alleviated, and the display effect optimized.

The display method will be described in detail below with reference to the accompanying drawings.

In step S1, image data of an irregularly-shaped area of a display panel is acquired.

The image data of the irregularly-shaped area can be obtained according to a grayscale image of the area, which can be specifically performed by an optical measuring module of a Demura detecting device, such as a high resolution and high precision Charge-coupled Device (CCD) camera. In this case, the step S1 may include: acquiring a grayscale image of the irregularly-shaped area of the display panel by a method of optical CCD photographing, for example, a grayscale image of the irregularly-shaped area of the display panel in the lighting state, and luminance signals in the image are extracted to be converted into the image data of the irregularly-shaped area.

Alternatively, the image data of the irregularly-shaped area may also be obtained according to an electrical signal of the area, which may be specifically performed by an electrical measurement module of a Demura detecting device, such as a sensing circuit of a driving chip. In this case, the step S1 may include extracting an electrical signal of the irregularly-shaped area of the display panel from the driving circuit of the display panel as the image data of the irregularly-shaped area.

In step S2, smoothing processing is performed based on the image data of the irregularly-shaped area to generate image compensation data.

In the exemplary embodiment, the smoothing process refers to a processing method that can transform the display edge of the irregularly-shaped area from a zigzag shape to an arc shape after data processing, which may be specifically performed by a compensation circuit of a signal processor.

Figure 5:
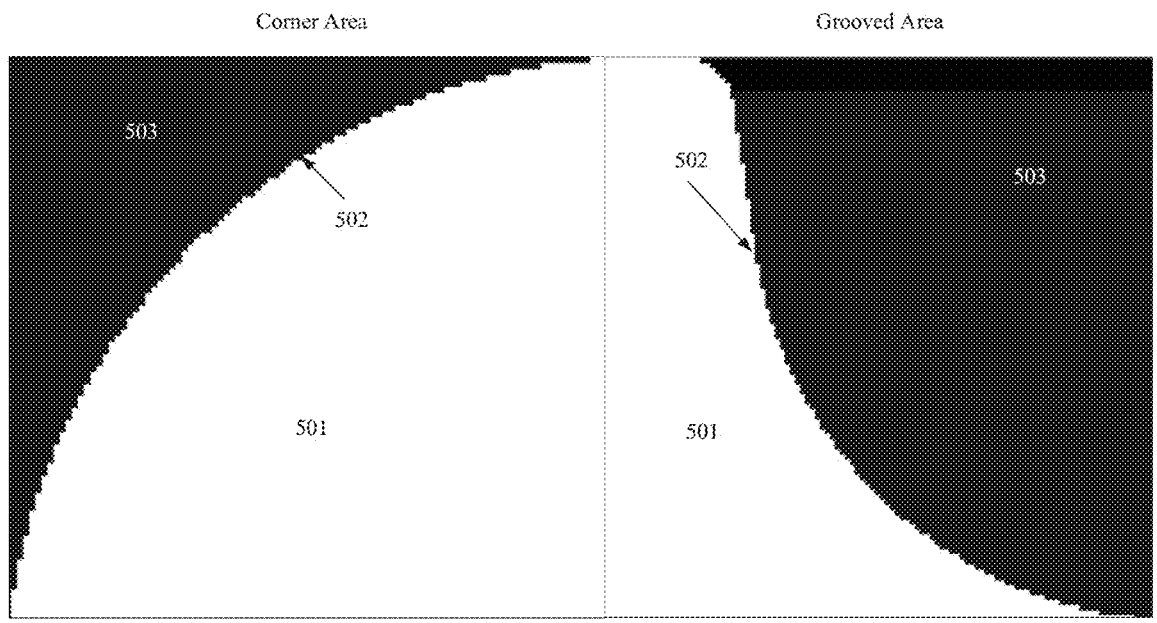
FIG. 5 is a schematic diagram showing a display image in an irregularly-shaped area before optimization in an exemplary embodiment of the present disclosure.

Specifically, as shown in FIG. 5, this step S2 may include the following steps.

In step S201, a partition processing is performed on the irregularly-shaped area based on the image data of the irregularly-shaped area to divide the irregularly-shaped area into an inner display area 501, a border display area 502, and a non-display area 503.

In step of S202, image compensation is performed respectively on the image data of the areas of the irregularly-shaped area based on the image data of the inner display area, the border display area, and the non-display area to generate image compensation data that makes the border display area present grayscale transition.

In this embodiment, the method for partitioning the irregularly-shaped area may include, referring to FIG. 5, pixel units arranged in sawtooth-shaped steps along the edge of the irregularly-shaped area are taken as a reference, a portion closer to the display area is taken as the inner display area 501, a portion away from the display area is taken as the non-display area 503, and the pixel units arranged in sawtooth-shaped steps are taken as the border display area 502. It should be noted that the non-display area 503 has no image data; however, in this embodiment, the image data of the non-display area 503 can be regarded as the image data corresponding to zero gray scale in order to apply the compensation algorithm in a unified manner, and thus, the image data of the non-display area 503 can also be considered as image data corresponding to zero gray scale. Therefore, the compensation for the non-display area 503 can also be regarded as compensation for the zero-gray image data.

Based on this, in the embodiment, the specific process for performing algorithm compensation on the image data of the areas of the irregularly-shaped area may include calculating image data after compensation respectively for the inner display area 501, the border display area 502, and the non-display area irregularly-shaped area as $X'=aX+b$, where X is the image compensation data, that is, the image data after compensation, X is the image data, that is, the image data before compensation, a is a compensation coefficient, and b is a compensation value. Specifically, the compensation coefficient a is a slope rate for adjusting the image data, and the compensation value b is an offset for adjusting the image data. By changing both of the compensation coefficient a and the compensation value b, the image data corresponding to the edge position of the display in the irregularly-shaped area can be adjusted to the image compensation data that makes the border display area to present grayscale transition.

In this way, in the embodiment, by appropriately setting the compensation coefficient a and the compensation value b, the border display area 502 of the irregularly-shaped area can be presented as a gray-scale transition image, thereby reducing the sensitivity of the human eye to the edge sawteeth and achieving compensation for the edge display effect of the irregularly-shaped area.

In the exemplary embodiment, in order to simplify the compensation algorithm of the image data, for the inner display area 501 and the non-display area 503, the processing may include keeping the image data unchanged, and for the border display area at the interface of the two areas, the processing may include performing the particular compensation algorithm. The parameter setting based on this idea is as follows.

The parameter setting for the inner display area 501 may include the compensation coefficient a=1 and the compensation value b=0, thereby ensuring that the image data of this area is kept unchanged before and after the compensation, thereby maintaining the display effect of the original image.

The parameter setting for the non-display area 503 may include the compensation coefficient a=0, the compensation value b=0, so that the area is kept in dark screen, that is, no light is emitted.

The parameter setting principle for the border display area 502 may be that the compensation coefficient a may be determined according to the absolute value of the tangent slope of the border display area and 0<a<1, and the compensation value b may be determined based on a difference in luminance between the inner display area adjacent to the border display area and the border display area, and determined according to the absolute value of the tangent slope of the border display area 502.

Figure 6:
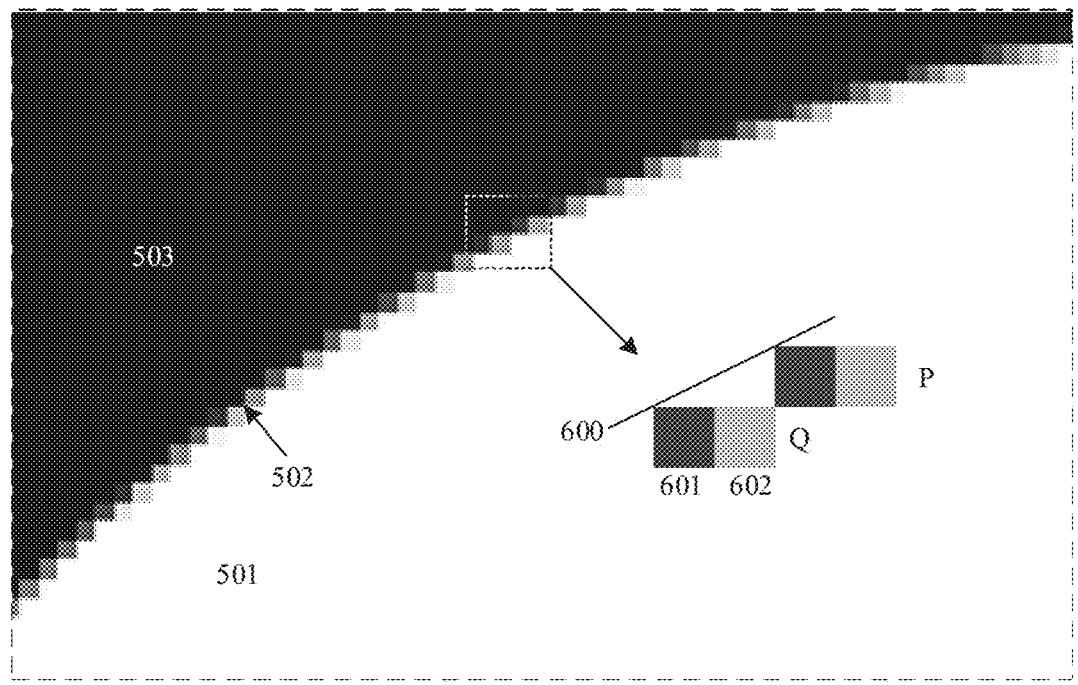
FIG. 6 is a schematic diagram illustrating a compensation algorithm in an exemplary embodiment of the present disclosure.

The tangent slope of the border display area 502 specifically refers to the tangent slope of the macro arc presented by the border display area 502 at a pixel point. In actual processing, as shown in FIG. 6, a tangent 600 may be approximated as a line connecting vertexes of two adjacent steps (such as a step P and a step Q) of the border display area 502, such as a line connecting upper left vertexes of the step P and the step Q. The larger the slope of the tangent 600, the larger a height difference between the two adjacent steps, or the smaller the number of pixel columns corresponding to the lower step (such as the step Q) of the two steps. This is relevant to the tangent slope of the border display area 502. In addition, it should be determined further based on the luminance difference between the inner display area 501 adjacent to the border display area 502 on the right side, for example, and the non-display area 503 adjacent to the border display area 502 on the left side, for example.

It should be noted that the parameter determining manner in the exemplary embodiment is not limited thereto, as long as it is a compensation method for adjusting the compensation coefficient a and/or the compensation value b to make the display edge to present a gray-scale transition, all of which is within the protection scope of the present disclosure.

In step S3, the image compensation data is converted into a driving compensation voltage to be output to the display panel.

The conversion of the image compensation data may be performed by a driving module of the display panel, such as a driving circuit. On this basis, by outputting the converted driving compensation voltage to the display panel, image compensation of the display edge of the irregularly-shaped area can be completed.

Based on the above steps S1-S3, the edge compensation effect of the irregularly-shaped area of the display panel can be realized, thereby improving the edge sawteeth phenomenon of the irregularly-shaped area, and thereby reducing the sensitivity of the human eye to the edge sawteeth.

The compensation process of the image data in the irregularly-shaped area will be illustrated taking the image data in the irregularly-shaped area is image data acquired according to the luminance signals of the grayscale image as an example.

First, referring to FIG. 5, in a white screen, that is, the highest brightness of the display panel, an optical measurement module such as a CCD camera of the Demura detecting device acquires a grayscale image of an irregularly-shaped area such as a corner area of the display panel and a grooved area for leaving space for the camera and the earphone, and extracts the luminance signals in the grayscale image to be converted into the image data of the irregularly-shaped area.

Then, the irregularly-shaped area is partitioned based on the image data of the irregularly-shaped area, taking pixel units arranged in sawtooth-shaped steps along the edge of the irregularly-shaped area as a reference, a portion closer to the display area is taken as the inner display area 501, a portion away from the display area is taken as the non-display area 503, and the pixel units arranged in sawtooth-shaped steps are taken as the border display area 502. In other words, when image data is acquired using a white image, the pixel units arranged in sawtooth-shaped steps along the edge of the irregularly-shaped area are taken as the border display area 502, a portion on one side of the border display area 502 which has a higher brightness is taken as the inner display area 501, and a portion on the other side of the border display area 502 which has a lower brightness is taken as the non-display area 503. Different algorithms are performed for image data of different areas.

Referring to FIG. 5, the parameter setting for the inner display area 501 may be the compensation coefficient a=1 and the compensation value b=0. That is, the image compensation data of the inner display area 501 in the irregularly-shaped area is calculated according to X'=X, to ensure that the image data of the area before and after the compensation is kept unchanged, thereby maintaining the display effect of the original image.

Referring to FIG. 5, the parameter setting for the non-display area 503 may be the compensation coefficient a=0, and the compensation value b=0. That is, the image compensation data of the non-display area 503 in the irregularly-shaped area is calculated according to X'=0, thereby maintaining the area in dark and not emitting light.

Referring to FIG. 6, the parameter setting of the border display area 502 may include connecting vertexes of two adjacent steps, for example, an upper left vertex of the step P and an upper left vertex of the step Q, to obtain an approximated tangent 600 of the border display area 502 at a pixel point, such as a left pixel of the step Q, and thereby obtaining the tangent slope of the border display area 502 at a pixel point. Then, the compensation coefficient a can be determined according to the tangent slope and 0<a<1; wherein the pixel column corresponding to the step Q is the first pixel column 601 and the second pixel column 602, that is, two pixel columns. This means that, from the non-display area 503 on the left side of the step Q to the display area 501 on the right side of the step Q, there are two pixel columns as a transition. Assuming that the non-display area 503 on the left side of the step Q corresponds to a gray level L0, and the inner display area 501 on the right side of the step Q corresponds to a gray level L255, the compensation value b is related to the gray level difference (L255-L0) between the left and right sides of the step Q and the number of pixel columns corresponding to the step Q. Specifically, the compensation value b can be determined as positively proportional to the gray level difference (L255-L0) between the left and right sides of the step Q, and is inversely proportional to the number of pixel columns corresponding to the step Q. Based on this, the image compensation data of the border display area 502 in the irregularly-shaped area can be calculated according to X'=aX+b, thereby generating image compensation data that makes the border display area to present grayscale transition. For example, the image data after compensation for the first pixel column 601 and the second pixel column 602 corresponding to the step Q may be L85 and L170, respectively, so that a grayscale transition image sequentially through L0, L85, L170, and L255 can be formed.

Figure 7:
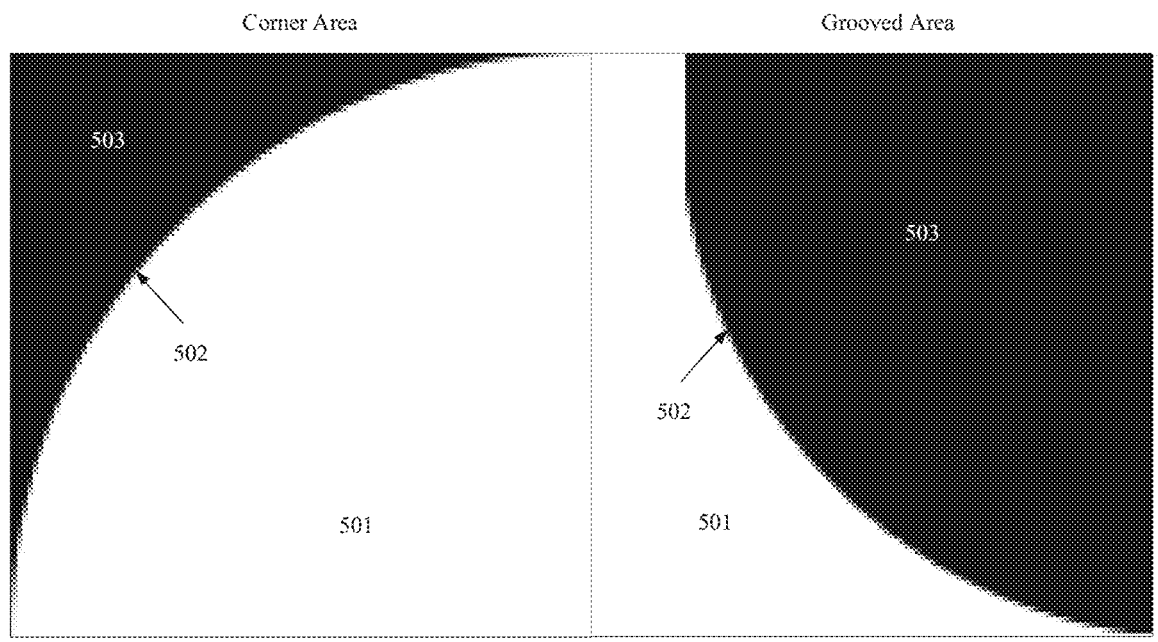
FIG. 7 is a schematic diagram showing a display image in an irregularly-shaped area after optimization in an exemplary embodiment of the present disclosure.

Finally, the image compensation data is converted into a driving compensation voltage by the driving module of the display panel and output to the display panel, thereby completing the compensation process of the irregularly-shaped area. FIG. 7 shows a display effect diagram of the irregularly-shaped area after the above compensation optimization, and it can be seen that it can achieve an effect of reducing the sensitivity of the human eyes to the edge sawteeth.

Based on the above, the compensation method in this example can be applied to the optimization of the edge display of the irregularly-shaped area of various display screens, the algorithm adjustment is relatively flexible, and the limitation of other compensation methods can be avoided, for example, an integrated circuit (IC) can only compensate for the border of a particular graph.

Figure 8:
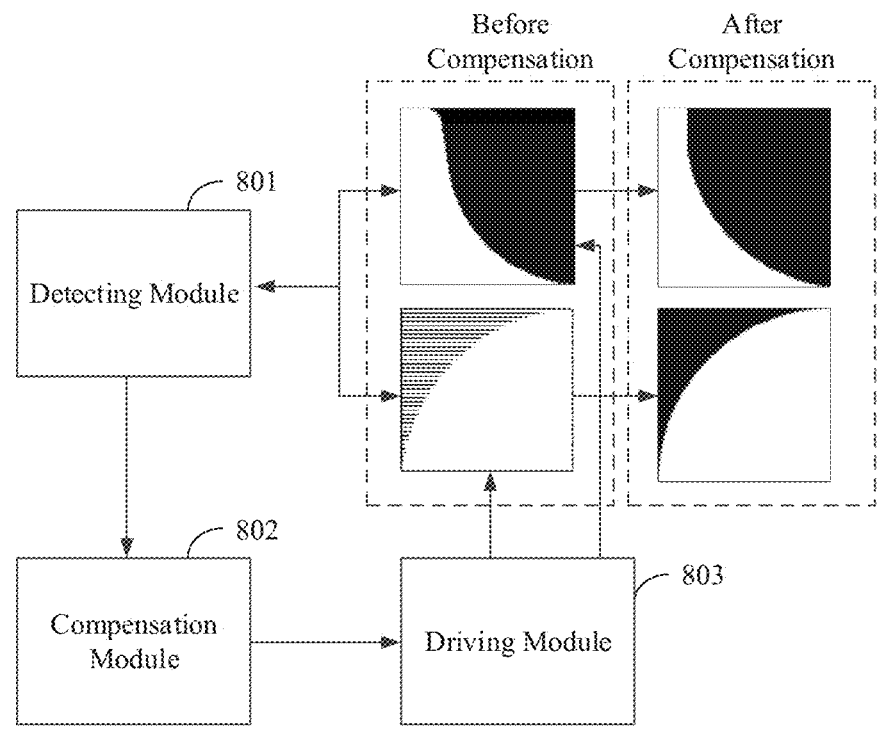
FIG. 8 schematically shows a block diagram of a display optimization device in an exemplary embodiment of the present disclosure.

Correspondingly, the exemplary embodiment further provides a display optimization device applied to the display image optimization of the irregularly-shaped area of the display panel, such as the corner area and the grooved area of the full screen. As shown in FIG. 8, the display optimization device may include:

a detecting module 801 configured to acquire image data of an irregularly-shaped area of a display panel;

a compensation module 802 configured to perform smoothing processing on the image data of the irregularly-shaped area to generate image compensation data; and a driving module 803 configured to convert the image compensation data into a driving compensation voltage to be output to the display panel.

In the display optimization device provided by the exemplary embodiment of the present disclosure, image compensation data can be generated according to image data of the irregularly-shaped area, to perform smoothing processing on the display edge of the irregularly-shaped area, and then the image compensation data is converted into a driving compensation voltage to be output to the display panel, so as to achieve the compensation effect on the display edge of the irregularly-shaped area. In this way, it can alleviate the edge sawteeth phenomenon of the irregularly-shaped area of the display panel, and optimize the display effect.

In the exemplary embodiment, the detecting module 801 may include:

an optical detecting unit configured to acquire a grayscale image of the irregularly-shaped area of the display panel, and convert the grayscale image of the irregularly-shaped area into the image data of the irregularly-shaped area; or an electrical detecting unit configured to extract an electrical signal of the irregularly-shaped area of the display panel from the driving circuit of the display panel as the image data of the irregularly-shaped area.

In the exemplary embodiment, the compensation module 802 may include:

a partitioning unit configured to perform a partition processing on the irregularly-shaped area based on the image data of the irregularly-shaped area, to divide the irregularly-shaped area into an internal display area, a border display area, and a non-display area; and a compensation unit configured to perform image compensation respectively on the image data of the areas of the irregularly-shaped area based on the image data of the internal display area, the border display area, and the non-display area to generate image compensation data that makes the border display area to present grayscale transition.

Specifically, the compensation unit may respectively calculate image compensation data of the inner display area, the border display area, and the non-display area of the irregularly-shaped area according to X'=aX+b; where X' is the image compensation data, X is the image data, a is a compensation coefficient, and b is a compensation value.

The parameter setting for the inner display area may be: the compensation coefficient a=1 and the compensation value b=0, thereby ensuring that the image data of this area is kept unchanged before and after the compensation, thereby maintaining the display effect of the original image.

The parameter setting for the non-display area may be: the compensation coefficient a=0, and the compensation value b=0 so that the area is kept in dark screen, that is, no light is emitted.

The parameter setting principle for the border display area may be that the compensation coefficient a may be determined according to the absolute value of the tangent slope of the border display area and 0<a<1, and the compensation value b may be determined based on a difference in luminance between the internal display area adjacent to the border display area and the border display area and determined according to the absolute value of the tangent slope of the border display area.

Based on the above, the display optimization device can perform smoothing processing on the display edge of the irregularly-shaped area to alleviate the edge sawteeth phenomenon of the irregularly-shaped area, thereby optimizing the display effect.

It should be noted that the specific details of the display optimization device have been described in detail in the corresponding display methods, and details are not described herein again.

Figure 9:
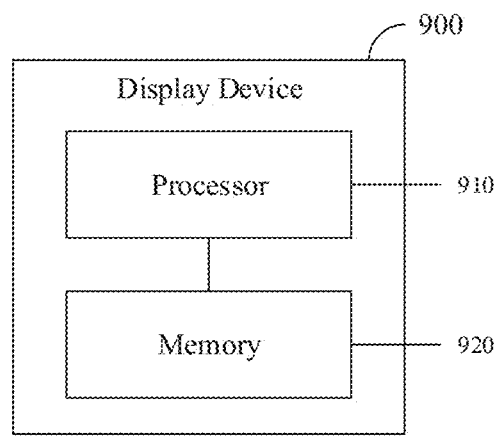
FIG. 9 schematically shows a schematic diagram of a display device of an exemplary embodiment of the present disclosure.

According to an embodiment of the present disclosure, as shown in FIG. 9, a display device 900 includes: a processor 910; and a memory 920 storing computer readable instructions that, when executed, cause the processor 910 to be configured to perform the display method according to the present disclosure. Various details of the display method according to the present disclosure have been described in detail with reference to the foregoing embodiments, which will not be repeated herein.

Figure 10:
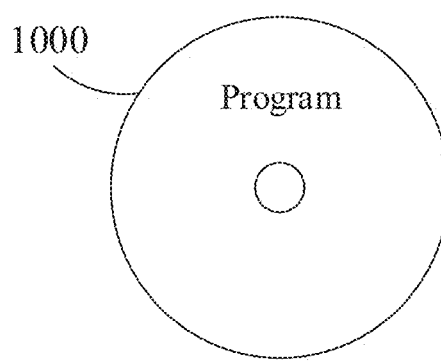
FIG. 10 is a schematic diagram showing a program product in an exemplary embodiment of the present disclosure.

Referring to FIG. 10, a program product 1000 for implementing the above method according to an embodiment of the present disclosure will be described, which may be a portable compact disk read only memory (CD-ROM) and includes program code, and may be at a terminal device, for example running on a personal computer. However, the program product of the present disclosure is not limited thereto, and in this document, the readable storage medium may be any tangible medium that contains or stores a program that can be used by or in connection with an instruction execution system, an apparatus, or a device.

The program product can be any combination of one or more readable media. The readable medium can be a readable signal medium or a non-transitory computer-readable storage medium. The readable storage medium can be, for example, but not limited to, an electronic, magnetic, optical, electromagnetic, infrared, or semiconductor system, an apparatus, or a device, or any combination of the above. More specific examples (non-exhaustive lists) of readable storage media include: an electrical connection with one or more wires, a portable disk, a hard disk, a random access memory (RAM), a read only memory (ROM), an erasable Programmable read-only memory (EPROM or flash memory), an optical fiber, a portable compact disk read only memory (CD-ROM), an optical storage device, a magnetic storage device, or any suitable combination of the foregoing.

The computer readable signal medium may include a data signal that is propagated in a baseband or as part of a carrier, carrying readable program codes. Such propagated data signals can take a variety of forms including, but not limited to, electromagnetic signals, optical signals, or any suitable combination of the foregoing. The readable signal medium can also be any readable medium other than a readable storage medium that can transmit, propagate, or transport a program for use by or in connection with an instruction execution system, an apparatus, or a device.

Program codes embodied on a readable medium can be transmitted using any suitable medium, including but not limited to wireless, a wire, an optical cable, RF, etc., or any suitable combination of the foregoing.

Program codes for performing the operations of the present disclosure may be written in any combination of one or more programming languages, including an object oriented programming language, such as Java, C++, etc., including conventional procedural programming language—such as the "C" language or a similar programming language. The program codes can be executed entirely on the user computing device, partially on the user device, as a stand-alone software package, partially on the remote computing device on the user computing device, or entirely on the remote computing device or server. In the case of a remote computing device, the remote computing device can be connected to the user computing device via any kind of network, including a local area network (LAN) or wide area network (WAN), or can be connected to an external computing device (e.g., using an Internet service provider to connect via the Internet).

The exemplary embodiment also provides a display device including the above display optimization device and a display panel. The display device can alleviate the edge sawteeth phenomenon of the irregularly-shaped area of the display panel, such as a corner area or a grooved area for leaving space for a camera and an earphone of a display panel, and optimize the display effect.

The display device may include any product or component having a display function, such as a mobile phone, a tablet computer, a television, a notebook computer, a digital photo frame, a navigator, and the like.

It should be noted that although several modules or units of a device for action execution are mentioned in the detailed description above, such division is not mandatory. Indeed, according to the embodiments of the present disclosure, the features and functions of two or more modules or units described above can be embodied in one module or unit. On the contrary, the features and functions of one of the modules or units described above may be further divided to be embodied by multiple modules or units. Furthermore, the modules or units of the present disclosure may be implemented by corresponding hardware, software, or a combination of hardware and software.

In addition, although the various steps of the method of the present disclosure are described in a particular order in the drawings, this is not required or implied that the steps must be performed in the specific order, or all the steps shown must be performed to achieve the desired result. Additionally or alternatively, certain steps may be omitted, multiple steps being combined into one step, and/or one step may be decomposed into multiple step and the like.

Other embodiments of the disclosure will be apparent to those skilled in the art from consideration of the specification and practice of the disclosure disclosed herein. This application is intended to cover any variations, uses, or adaptations of the disclosure following the general principles thereof and include such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A display method, comprising:
acquiring image data of an irregularly-shaped area of a display panel;
performing smoothing processing on the image data of the irregularly-shaped area to generate image compensation data by:
  performing a partition processing on the irregularly-shaped area based on the image data of the irregularly-shaped area to divide the irregularly-shaped area into an internal display area, a border display area, and a non-display area; and
  performing image compensation respectively on the image data of the areas of the irregularly-shaped area based on the image data of the internal display area, the border display area, and the non-display area to generate image compensation data that makes the border display area to present grayscale transition, wherein performing the image compensation respectively on the image data comprises: calculating image compensation data of the inner display area, the border display area, and the non-display area of the irregularly-shaped area according to $X'=aX+b$, where $X'$ is the image compensation data, $X$ is the image data, $a$ is a compensation coefficient, and $b$ is a compensation value; and converting the image compensation data into a driving compensation voltage to be output to the display panel.

2. The display method according to claim 1, wherein acquiring image data of an irregularly-shaped area of a display panel comprises:
acquiring a grayscale image of the irregularly-shaped area of the display panel, and converting the grayscale image of the irregularly-shaped area into the image data of the irregularly-shaped area.

3. The display method according to claim 2, wherein when the display panel displays a white screen, the grayscale image of the irregularly-shaped area is acquired by an optical measuring device.

4. The display method according to claim 1, wherein acquiring image data of an irregularly-shaped area of a display panel comprises:
extracting an electrical signal of the irregularly-shaped area of the display panel from a driving circuit of the display panel as the image data of the irregularly-shaped area.

5. The display method according to claim 1, wherein:
pixel units arranged in sawtooth-shaped steps along an edge of the irregularly-shaped area are taken as the border display area;
a portion on one side of the border display area which has a higher brightness is taken as the inner display area; and
a portion on the other side of the border display area which has a lower brightness is taken as the non-display area.

6. The display method according to claim 1, wherein:
for the border display area, the compensation coefficient a is determined according to an absolute value of a tangent slope of the border display area and 0<a<1, and the compensation value b is determined according to a luminance difference between the inner display area adjacent to the border display area and the border display area, and an absolute value of a tangent slope of the border display area;
for the inner display area, the compensation coefficient a=1, the compensation value b=0; and
for the non-display area, the compensation coefficient a=0, and the compensation value b=0.

7. The display method according to claim 1, further comprising:
providing a display device comprising: a display panel having an irregularly-shaped area; a processor; and a memory storing computer readable instructions that, when executed, cause the processor to be perform the display method of claim 1.

8. A system, comprising:
a display optimization device, comprising:
a detecting circuit configured to acquire image data of an irregularly-shaped area of a display panel;
a compensation circuit configured to perform smoothing processing on the image data of the irregularly-shaped area to generate image compensation data, wherein the compensation circuit comprises:
a partitioning sub-circuit configured to perform a partition processing on the irregularly-shaped area based on the image data of the irregularly-shaped area, to divide the irregularly-shaped area into an internal display area, a border display area, and a non-display area; and
a compensation sub-circuit configured to perform image compensation respectively on the image data of the areas of the irregularly-shaped area based on the image data of the internal display area, the border display area, and the non-display area, to generate image compensation data that makes the border display area to present grayscale transition, wherein the compensation sub-circuit is configured to respectively calculate image compensation data of the inner display area, the border display area, and the non-display area of the irregularly-shaped area according to $X'=aX+b$, where $X'$ is the image compensation data, $X$ is the image data, $a$ is a compensation coefficient, and $b$ is a compensation value; and
a driving circuit configured to convert the image compensation data into a driving compensation voltage to be output to the display panel.

9. The system according to claim 8, wherein the detecting circuit comprises:
an optical detecting sub-circuit configured to acquire a grayscale image of the irregularly-shaped area of the display panel, and convert the grayscale image of the irregularly-shaped area into the image data of the irregularly-shaped area.

10. The system according to claim 8, wherein the detecting circuit comprises:
an electrical detecting sub-circuit configured to extract an electrical signal of the irregularly-shaped area of the display panel from a driving circuit of the display panel as the image data of the irregularly-shaped area.

11. The system according to claim 8, wherein:
for the border display area, the compensation coefficient a is determined according to an absolute value of a tangent slope of the border display area and 0<a<1, and the compensation value b is determined according to a luminance difference between the inner display area adjacent to the border display area and the border display area, and an absolute value of a tangent slope of the border display area;
for the inner display area, the compensation coefficient a=1, the compensation value b=0; and
for the non-display area, the compensation coefficient a=0, and the compensation value b=0.

12. The system according to claim 8, further comprising:
a display device comprising the display optimization device and a display panel.

13. A non-transitory computer-readable medium storing program instructions that, when executed by a processor of a smart shopping system, directs the smart shopping system to perform a method comprising:
acquiring image data of an irregularly-shaped area of a display panel;
performing smoothing processing on the image data of the irregularly-shaped area to generate image compensation data by:
performing a partition processing on the irregularly-shaped area based on the image data of the irregularly-shaped area, to divide the irregularly-shaped area into an internal display area, a border display area, and a non-display area; and
performing image compensation respectively on the image data of the areas of the irregularly-shaped area based on the image data of the internal display area, the border display area, and the non-display area, to generate image compensation data that makes the border display area to present grayscale transition, wherein performing image compensation respectively on the image data comprises: calculating image compensation data of the inner display area, the border display area, and the non-display area of the irregularly-shaped area according to $X'=aX+b$, where $X'$ is the image compensation data, $X$ is the image data, $a$ is a compensation coefficient, and $b$ is a compensation value; and converting the image compensation data into a driving compensation voltage to be output to the display panel.

* * * * *